United States Patent [19]

Lin

[11] 4,278,962
[45] Jul. 14, 1981

[54] AUTOMATIC ALARM SYSTEM FOR DETECTING OBSTACLES BEHIND A BACKING VEHICLE

[75] Inventor: Pin-Houn Lin, Taipei, Taiwan

[73] Assignee: Reino International Corporation, Taipei, Taiwan

[21] Appl. No.: 960,641

[22] Filed: Nov. 14, 1978

[51] Int. Cl.³ .......................... G08G 1/00; G08G 1/16
[52] U.S. Cl. ..................................... 340/34; 312/237; 340/32; 340/52 H; 367/909
[58] Field of Search ..................................... 340/32–34, 340/61, 52 H, 53, 70, 1 R, 16 R; 180/167, 169; 343/7 VM, 18 R; 325/111, 117, 119, 16, 312, 352; 312/7 R, 237, 349, 350; 367/135, 137, 909; 455/95, 99, 128, 89, 345, 347

[56] References Cited

U.S. PATENT DOCUMENTS 3,681,750  8/1972  Larka ........................................ 340/33
3,892,483  7/1975  Saufferer ................................. 340/34

*Primary Examiner*—James J. Grody

*Attorney, Agent, or Firm*—Burns, Doane, Swecker & Mathis

[57] ABSTRACT

An automatic alarm is disclosed for detecting obstacles behind a vehicle as the vehicle travels backwards. The alarm includes a casing mounted at the rear of the vehicle and having a rearwardly facing opening. A revolving disc is mounted within the casing which is driven by a motor in the casing. A printed circuit plate is fixed within the casing under the revolving disc. A supersonic transmitting member is installed on the revolving disc. A supersonic receiving member is installed on the revolving disc. The transmitting and receiving members are simultaneously alignable with the opening and are electrically connected to a printed circuit on the printed circuit plate at least when the transmitting and receiving members are aligned with the opening, so that the transmitting member emits a signal which is deflected off adjacent obstacles and is detected by the receiving member. An alarm member is connected in series with the circuit on the printed circuit plate so that deflected signals detected by the receiving member actuate the alarm member to alert a driver of the vehicle.

8 Claims, 11 Drawing Figures

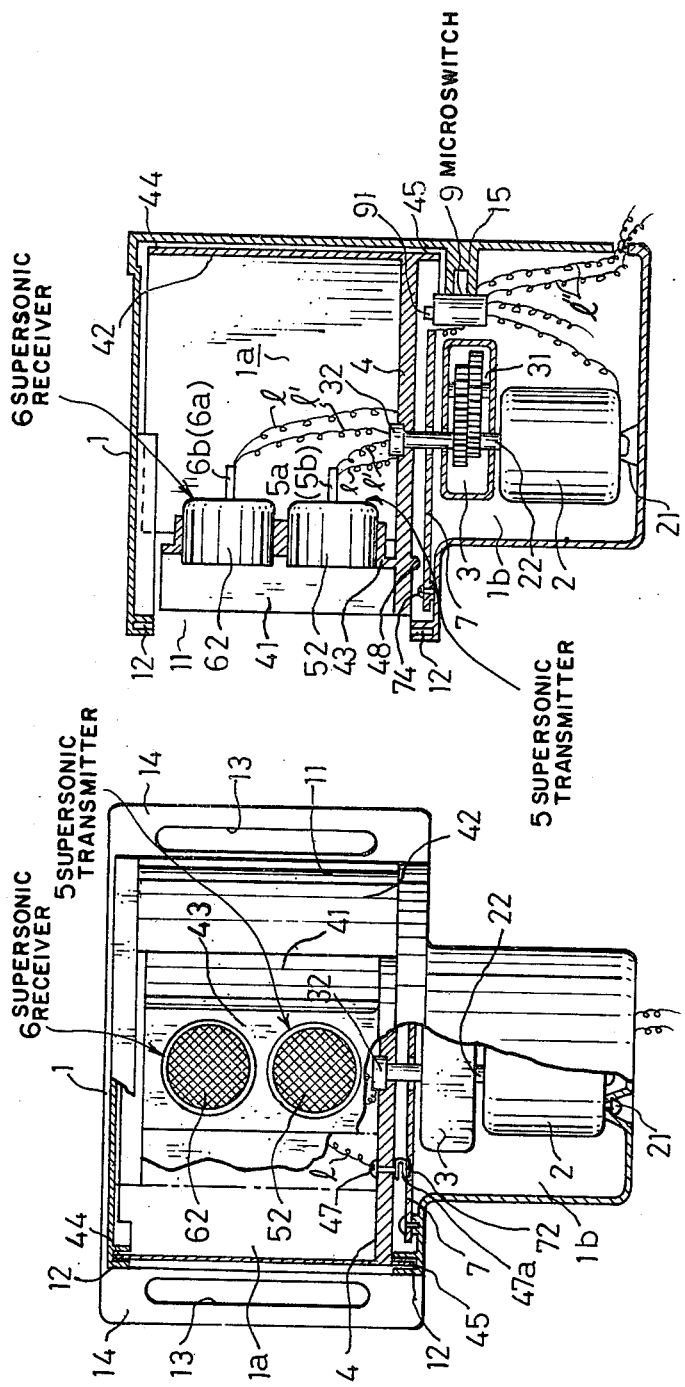

AUTOMATIC ALARM SYSTEM FOR DETECTING OBSTACLES BEHIND A BACKING VEHICLE

FIELD OF THE INVENTION

The present invention relates generally to an automatic alarm system for detecting obstacles behind a backing vehicle and more particularly to an alarm system having supersonic transmitter and receiver members installed at the rear of a car and a sound/light alarm provided on the driver's panel. Obstacles behind the car are sensed by the supersonic wave at a predetermined safety distance and the reflection therefrom is received to actuate electrically the sound/light alarm to inform the driver of the backing condition.

BACKGROUND OF INVENTION

A rear-view mirror seems to be the only aid to the driver during backing of a car. However, observation through the mirror can hardly reflect the true condition at the rear and the angle of backing cannot be exactly sure. In many occasions, the driver has to turn around to see what is actually happening. This is not only tiresome but also dangerous, especially during foggy weather or a rainy day when visibility is poor.

The present invention is devised to overcome the abovesaid drawbacks.

SUMMARY OF INVENTION

Therefore the main object of the present invention is to provide an automatic alarm system for car backing which utilizes electronic sensing with supersonic wave to detect whatever obstacles are behind the car and acutate electrically a sound/light alarm to warn the drivers of the backing condition and assure backing safety.

Another object of the present invention is to provide an automatic alarm system for car backing, so as to free the driver from turning back his head to see whether there is an obstacle behind during backing.

Still another object of the present invention is to provide an automatic alarm system for car backing wherein a pair of supersonic transmitter and receiver members are installed at rear of a car. The members may be arranged horizontally or vertically with each other and are installed upon a motor driven revolving disc capable of rotating 360°. Reflection of the transmitted wave from the obstacle is received to actuate a sound/light alarm provided on the driver's panel to show the true condition behind the car.

A further object of the present invention is to provide an automatic alarm system for car backing which scans by means of a supersonic wave, whereby any obstacle is capable of being effectively and accurately detected therebehind within an angle of 180° and at a given safety distance.

A still further object of the present invention is to provide an automatic alarm system for car backing wherein a dust cover is provided to automatically open and reveal transmitting/receiving members during use, while covering up automatically when not in use.

Another object of the present invention is to provide an automatic alarm system for car backing wherein a pair of terminals are disposed under a revolving disc to contact a pair of arc shaped conductors on a printed circuit plate to achieve an intermittent transmitting/receiving function.

A still another object of the present invention is to provide an automatic alarm system for car backing wherein the distance of wave transmitting/receiving changes with the scanning angle.

Other objects and features of the present invention will become apparent from the following detailed description to be taken in conjunction with the annexed drawings.

BRIEF DESCRIPTION OF DRAWINGS

FIG. 2 is a front view of the same embodiment with a partial cutaway;

FIG. 3 is a side view with a partial cutaway;

DETAILED DESCRIPTION OF EMBODIMENTS

Figures 1, 4:
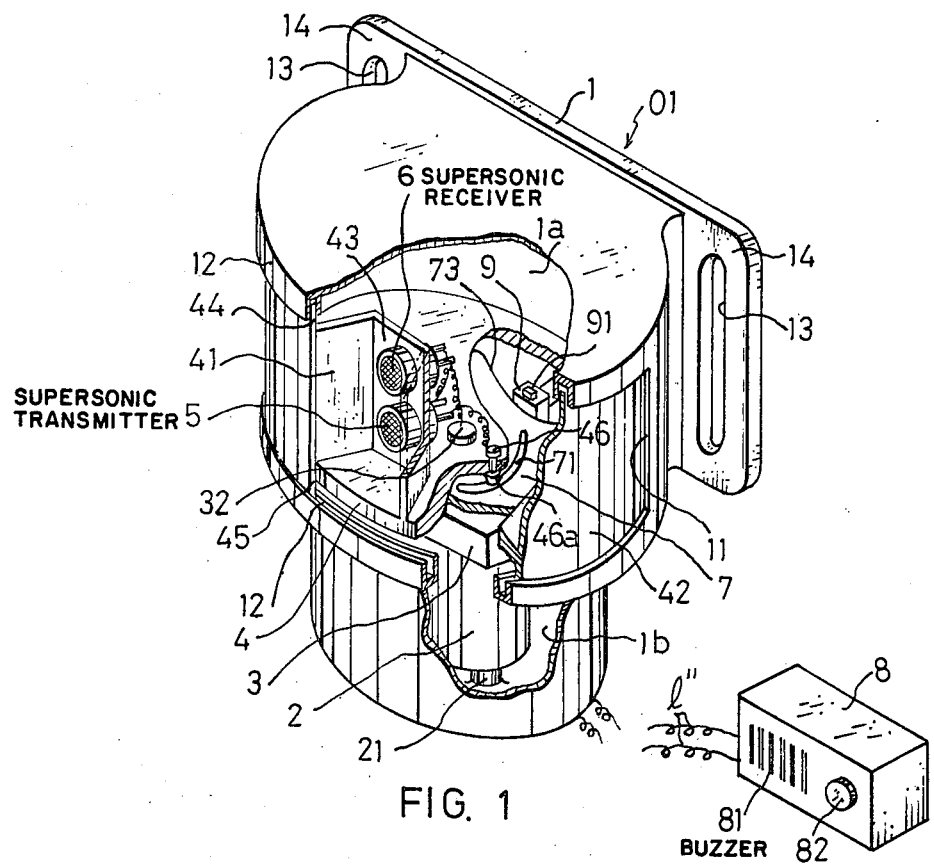
FIG. 1 is a perspective view of a preferred embodiment of the automatic alarm system for car backing according to the present invention with a partial cutaway.
FIG. 4 is a top view with a partial cutaway.

Now referring to FIGS. 1 through 4, the automatic alarm system 01 of the present invention comprises a casing 1, a motor 2 retained within the casing 1, a reduction gear box 3, a revolving disc 4, a supersonic transmitter 5, a supersonic receiver 6, a printed circuit plate 7 and a sound/light alarm 8.

The casing 1 is divided into two sections 1a, 1b, both of cylindrical shape. The diameter of the upper section 1a is greater than that of the lower section 1b. The revolving disc 4, supersonic transmitter 5, receiver 6 and printed circuit 7 are retained in the upper section 1a. An opening 11 extends through half of the circle (180 degrees) at the front of upper section 1a. The opening 11 has its upper and lower edges provided with semicircular guide channels 12—12. At the back of the casing 1, a pair of mounting flanges 14—14 having slots 13—13 projection from both sides. The lower section 1b of the casing 1 is a sealed chamber in which the motor 2 is vertically mounted, with a supporting member 21 and having the motor shaft 22 standing upright.

Above the motor 2, the gear box 3 with a reduction gear train 31 is connected to the motor shaft 22. An output shaft 32 of the gear train 31 projects upwardly through a center opening of the printed circuit plate 7 along the center line of the upper section 1a of the casing 1. The revolving disc 4 is mounted to the top end of the output shaft 32, so that when the motor 2 is actuated, the disc 4 is rotated at a predetermined speed via reduction gear train 31.

The revolving disc 4 has a circular vertical wall 42 which serves as a dust cover and extends from the ends of a funnel shaped opening 41 toward both sides along the periphery of the disc 4. A vertical plate 43 is provided at the center of the funnel shaped opening 41 for the mounting of the supersonic transmitter 5 and receiver 6.

The upper edge 44 of the dust cover 42 has a peripheral circumferential length greater than that of the guide channels 12 is slidably inserted into the upper channel, while the corresponding lower edge 45 is likewise inserted into the lower channel 12. When the funnel shaped opening 41 is placed at front center of the casing opening 11, upper and lower edges 44, 45 still remain in the channels 12, 12 to assure a smooth rotation.

In FIG. 4, it can been seen that through the floor of disc 4, electric terminals 46 and 47 are disposed respectively at different radial distances ($r_1$ $r_2$) from the center of the disc. Input terminals 5a, 6a of the transmitter 5 and receiver 6 are connected via conduct wires 1 to the respective upper ends of terminals 46 and 47. The lower ends of terminals 46 and 47 contact the respective upper surfaces of two arc shaped conductor plates 71, 72 disposed upon the printed circuit plate 7 under said disc 4 between the upper section 1a and the lower section 1b of the casing via spring contacts 46a, 47a. The output ends of the transmitter 5 and receiver 6 are grounded via lead wires 1' to the center shaft 32 of the disc 4. The printed circuit plate 7 is a round disc with a recess 73 formed at the rear part and is fixed within the casing 1 by suitable means such as screw 74. The conductor plates 71, 72 are located respectively on each circular track having different radial distances ($r_1$, $r_2$) to the center of the disc 4. Each conductor 71, 72 occupies an appropriate angle ($\theta$) which is about 120° in this embodiment and shall not exceed the angle of opening 11. When the disc rotates continuously, the transmitter 5 and the receiver are activated only when the spring contacts 46a, 47a of the terminals 46, 47 contact the conductors 71, 72 along their occupied angle; and are deactivated as soon as the spring contacts 46a, 47a leave the conductors 71, 72. In other words, the transmitter 5 and receiver 6 operate only within the angle ($\theta$) of the conductors 71, 72 and in an intermittent mode.

Figures 5, 6:
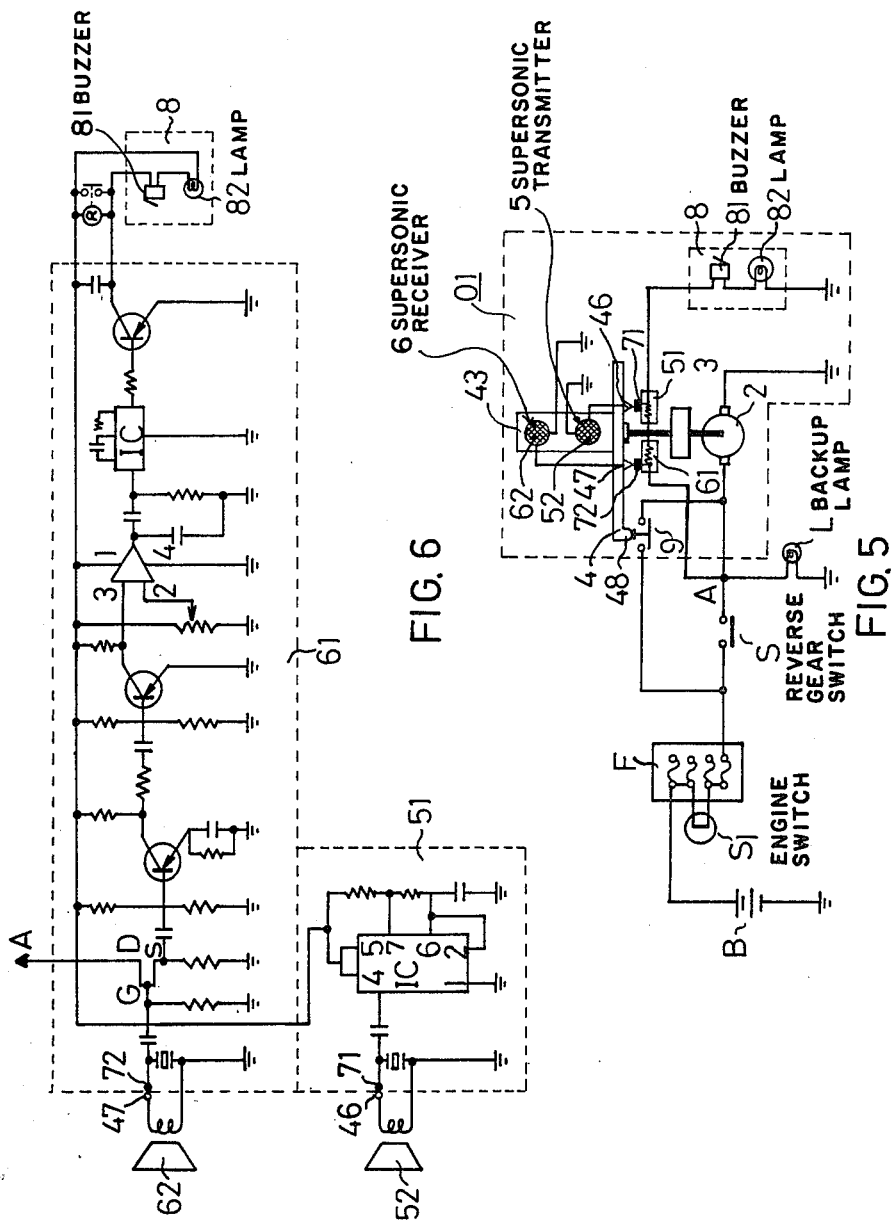
FIG. 5 is a circuit diagram with which the present invention is installed.
FIG. 6 is an embodiment of supersonic transmitting/receiving circuit of the present invention.

In addition to the conductors 71, 72, the printed circuit plate 7 further contains, upon the plate, a circuit 51 for the transmitter 5 and a main oscillating and amplifying circuit 61 for the receiver 6 such as shown in FIGS. 5 and 6. The respective horns 52, 62 of the transmitter 5 and receiver 6 are disposed on the revolving disc 4 and connected via terminals 46, 47, spring contactors 46a, 47a, and conductors 71, 72 to the circuits 51, 61 to complete the supersonic wave transmitting and receiving circuits. The input side of the circuitry is connected in parallel with the ordinary backing signal circuit and the output side is connected in series with a sound/light alarm 8 having a buzzer 81 and an alarm signal lamp 82. The alarm 8 is disposed on the driver's panel such as shown in FIG. 7.

Referring once more to FIG. 3, a normally closed micro-switch 9 is disposed on a supporting arm 15 projecting inwardly from about the center of the upper wall of section 1b of the casing 1. A trigger 91 of the switch 9 is disposed upright beneath the disc 4. The switch 9 as shown in FIG. 5, is connected in series between a power source B and the motor 2 and in parallel with a reverse shift switch S of the car transmission. A projection 48 under the disc 4 serves to open the switch 9 when the disc 4 rotates to a position right on top of the switch 9.

Figure 7:
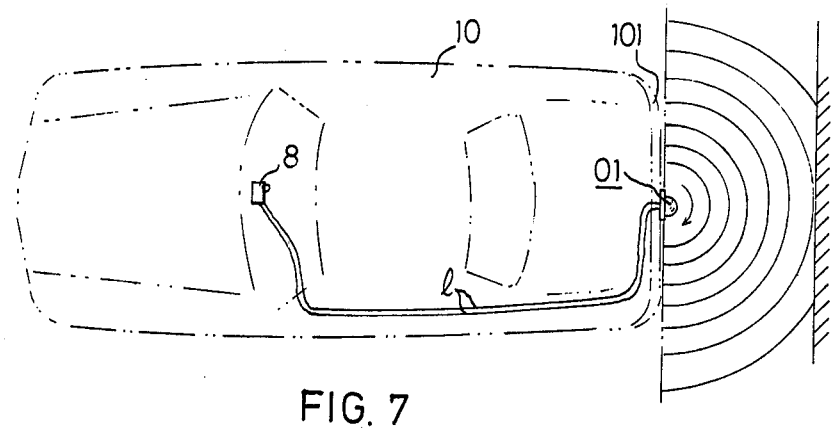
FIG. 7 is a schematic diagram showing installation of the present invention on a car.
Figure 8:
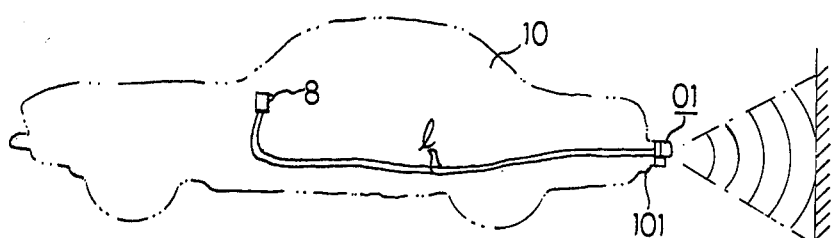
FIG. 8 is a schematic diagram showing the effective range of emitting of the present invention.

The device is mounted on the center of the rear bumper and operated as shown in FIGS. 7 and 8 and is connected through lead wire 1" to the alarm 8 disposed on the driver's panel in the driver's cabin. The circuit shown in FIG. 5 depicts: the original car battery B, the engine switch $S_1$, the fuse panel F, the reverse shift switch S, the backing signal lamp L, and the system 01 of the present invention. Since the components have been described herein before, only a schematic diagram is used to show their relationship in circuitry.

The preferred circuit of the transmitter 5 and receiver 6 shown in FIG. 6, including the oscillating circuit 51 and the amplifying circuit 61, are known to all and shall not be detailed further. Both circuits are disposed on the printed circuit plate 7 and only the sensing member or horns 52 and 62 are disposed on the revolving disc 4. Such an arrangement together with the terminal 46, 47 being able to revolve with the disc 4 and contact the fixed conductors 71, 72 to intermittently close and open the power source switch is the unique feature of the present invention.

Operation of the present invention is now detailed with respect to FIG. 5. When the transmission gear is shifted to reverse position ready for the backing of the car, the reverse shift switch S is closed. Then, backing signal lamp L at the rear of the car is lighted and motor 2 of the present system 01 is started. Disc 4 with transmitter 5 and receiver 6 thereon is rotated by reduction gear 3. When terminals 46, 47 on disc 4 contact conductors 71, 72, transmitter 5 starts to transmit supersonic waves, and receiver 6 starts to work in the meantime and ready to receive the signal reflected from whatever obstacle may be situated behind the car. The action of transmitter/receiver is effective only within the angle $\theta$ when the transmitter/receiver is in a position just within the opening 11 of the casing 1. The transmitted wave dispersed rearward, scanning angle of which reaches almost as wide as 180° as shown in FIGS. 7 and 8. When the wave gets in contact with any obstacle within the predetermined safety range, the wave would be reflected and received by the receiver 6 to actuate the circuit 61 to get the sound/light alarm 8 to perform the work and let the driver brake the backing car in time. As soon as the car finishes backing, the gear is shifted to "neutral" position, the switch S is opened, yet the disc 4 keeps to rotate until the projection 48 opens the switch 9 then the motor 2 stops. Since the projection 48 is disposed in opposite to the dust cover 42, therefore when the motor 2 stops, the dust cover is in a position to cover right up the opening 11 and the transmitter 5 and receiver 6 are retained within the casing 1 to get protection from dust and weathering when the device is not in use, to avoid unnecessary damage.

Figure 10:
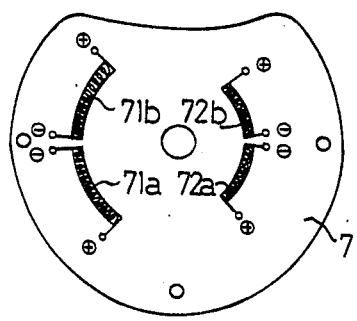
FIG. 10 is a diagram showing an embodiment of conducting part where the sensing distance of transmitter/receiver changes with rotating angle.
Figure 9:
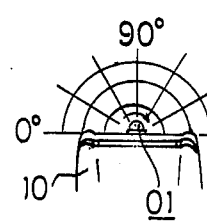
FIG. 9 is a diagram showing the effective range of sensing of the present invention.
Figure 11:
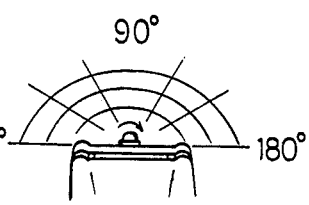
FIG. 11 is a schematic diagram showing the effective sensing range of the system of FIG. 10.

The effective sensing distance can be predetermined at such as one meter both for the transmitter and receiver under any scanning angle, such as shown in FIG. 9, the semi-circular range is known as safety range. In FIG. 10, at least one pair of variable resistor 71a, 71b and 72a, 72b are used to substitute said conductors 71, 72. A number of seriesly connected resistors of various value can also be used as equivalent such as shown in FIG. 11, then a variable effective transmitting distance can be achieved depending upon the variation in the angle of scanning, transmitting distance being the longest at 0° then decreases with increasing of angle, till 90° the transmitting distance being the shortest, then again increases til the angle reaches 180°, at which the range becomes equal to that of 0°. In such a way, even if the obstacle is at a deviated position behind the car, the effective range will be just the same as the obstacle is right facing the rear of the car. The backing operation will be much safer.

Furthermore, the transmitter 5 and receiver 6 are shown disposing at up/down overstacking, evidently, the up/down positions are interchangeable and it is also practicable as to arrange transmitter/receiver left-right with each other. The circuitry of course can be varied to be different from that being shown in FIG. 6. Further, disc 4 is designated to revolve 360° as in the embodiment, a rocking mechanism may also be added to cause the disc 4 rocking within the range of opening 11 thereby the scanning of the transmitting and receiving is effected within this range. All these modification are within reach of those skilled of the art and shall no more be detailed here.

I claim:

1. An automatic alarm system for detecting vehicles behind a backing vehicle, comprising:
   a casing having a generally cylindrical form with an opening therein, said casing being mountable on the rear end of the vehicle such that said opening faces rearwardly,
   a revolving disc mounted within said casing,
   a motor mounted within said casing,
   a reduction gear assembly interconnecting said motor and said disc whereby said motor rotates said disc,
   a printed circuit plate fixed within said casing under said revolving disc,
   a supersonic transmitting member installed on said revolving disc,
   a supersonic receiving member installed on said revolving disc,
      said transmitting and receiving members being simultaneously alignable with said opening, and being electrically connected to a printed circuit on said printed circuit plate at least when said transmitting and receiving members are aligned with said opening, so that said transmitting member emits a signal which is deflected off adjacent obstacles and detected by said receiving member, and
   an alarm means connected in series with said circuit on said printed circuit plate so that deflected signals detected by said receiving member actuate said alarm means to alert a driver of the vehicle.

2. An alarm system according to claim 1, wherein said disc has a projection depending downwardly therefrom, said casing comprising:
   an upper half section having said opening and upper and lower semi-circular guide channels on upper and lower edges of said opening, and a mounting flange being provided at the rear portion of said casing for connection to the vehicle, and
   a lower half section carrying said motor and said reduction gear assembly and a supporting arm carrying a microswitch which is electrically connected to said printed circuit for being actuated by said projection to shut off said motor.

3. An alarm system according to claim 1, wherein said casing includes vertically spaced guide channels at upper and lower edges of said opening, said disc has its center fixed on an output shaft of said reduction gear assembly and carries two terminals; a mounting plate disposed on said disc upon which said transmitting and receiving members are mounted, the front of said mounting plate defining a funnel shaped opening; a dust cover extending from opposite sides of the funnel shaped opening and having its upper and lower edges slidably inserted into said upper and lower guide channels.

4. An alarm system according to claim 3, wherein said disc includes two electrical contacts depending downwardly therefrom and being electrically connected to said transmitting member and said receiving member, respectively, said printed circuit plate being located between said revolving disc and said reduction gear assembly, and having thereupon supersonic transmitting and receiving circuits, and two arc shaped conductors disposed to contact said two terminals to electrically connect said transmitting member and said receiving member to said printed circuit as said disc rotates.

5. An alarm system according to claim 4, wherein said two terminals provided on said revolving disc are connected respectively in series to said supersonic transmitting member and receiving member, said terminals each including a spring contact for contacting said arc-shaped conductors.

6. An alarm system according to claim 3, wherein said two terminals are respectively disposed on said revolving disc at different radial distances to the center of said disc.

7. An alarm system according to claim 4, wherein said two arc-shaped conductors each occupy an angle of about 120° and are simultaneously in contact with said terminals.

8. An automatic alarm system for detecting obstacles behind a backing vehicle, comprising:
   a casing having a generally cylindrical form and comprising:
      an upper section having a first opening at the front, the upper and lower edges of said first opening including semi-circular upper and lower guide channels, a pair of mounting flanges being provided for installing the casing upon the rear of the vehicle such that said first opening faces rearwardly,
      a lower section carrying a motor and a microswitch, the motor including an output shaft projecting upwardly along a central axis line of said casing,
   a reduction gear assembly mounted above said motor,
   a revolving disc being located under said upper section of said casing and above said reduction gear assembly, said disc having its center fixed on an output shaft of said reduction gear assembly and having two electrical terminals provided thereon, said disc comprising:
      a vertical plate defining a funnel-shaped second opening,
      a supersonic transmitter and receiver mounted on said vertical plate within said second opening, said transmitter and receiver being simultaneously alignable with said first opening so that signals emitted from said transmitter deflect-off obstacles and are sensed by said receiver,
      a dust cover extending from opposite sides of the funnel-shaped second opening, an upper edge of said cover being slidably inserted into said upper guide channel, and a lower edge thereof being slidably inserted into said lower guide channel, and two electrical contacts projecting from a bottom surface of said disc and electrically coupled to said transmitter and receiver, a printed circuit plate fixed within said casing between said revolving disc and said reduction gear assembly, and containing a supersonic transmitting and receiving circuit, said printed circuit plate including two arc-shaped conductors contactible with said contacts on said disc to connect said circuit with said transmitter and receiver, and an alarm means connected to said circuit such that said transmitter transmits supersonic waves when said vehicle is backing, which waves deflect-off adjacent obstacles and are received by said supersonic receiver to activate said alarm means.

* * * * *